US012696065B2

(12) United States Patent
Watfa

(10) Patent No.: US 12,696,065 B2
(45) Date of Patent: Jul. 28, 2026

(54) METHOD AND APPARATUS FOR PROVIDING EMERGENCY SERVICE IN A NETWORK

(71) Applicant: SAMSUNG ELECTRONICS CO., LTD., Suwon-si (KR)

(72) Inventor: Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 17/995,691

(22) PCT Filed: Mar. 9, 2021

(86) PCT No.: PCT/KR2021/002887
§ 371 (c)(1),
(2) Date: Oct. 6, 2022

(87) PCT Pub. No.: WO2021/206295
PCT Pub. Date: Oct. 14, 2021

(65) Prior Publication Data
US 2023/0140726 A1 May 4, 2023

(30) Foreign Application Priority Data

Apr. 8, 2020 (GB) ...................................... 2005242
Aug. 24, 2020 (GB) ...................................... 2013218

(51) Int. Cl.
*H04W 4/90* (2018.01)
*H04W 28/06* (2009.01)
*H04W 76/20* (2018.01)

(52) U.S. Cl.
CPC ............. *H04W 4/90* (2018.02); *H04W 28/06* (2013.01); *H04W 76/20* (2018.02)

(58) Field of Classification Search
CPC ....... H04W 4/90; H04W 76/20; H04W 28/06; H04W 4/70; H04W 76/22; H04W 76/27;
(Continued)

(56) References Cited

U.S. PATENT DOCUMENTS 10,111,077 B1 * 10/2018 Bitra ...................... H04W 4/025
10,567,995 B2 2/2020 Kawasaki et al.
(Continued)

FOREIGN PATENT DOCUMENTS

CN 108809550 A 11/2018
CN 109891919 A 6/2019
(Continued)

OTHER PUBLICATIONS

International Search Report and Written Opinion of the International Searching Authority dated Jun. 10, 2021, in connection with International Application No. PCT/KR2021/002887, 10 pages.
(Continued)

*Primary Examiner* — Jean A Gelin

(57) ABSTRACT

A method, for a UE in a network, for requesting an emergency service is disclosed. The method comprises: when an emergency service is required, if the UE is using CP CIoT optimization, transmitting a NAS message including an indication that an emergency service is requested. The NAS message may be a CPSR message, and the indication may be a predetermined value (e.g. denoting "emergency service") in a predetermined field (e.g. Control plane service type field) of the message. Alternatively, the NAS message may be a Service Request message, the indication may be a predetermined value (e.g. denoting "emergency service" or "emergency service fallback") in a predetermined field (e.g. Service type field) of the message, and transmitting the Service Request message may be prioritised over transmit- (Continued)

Identify that an emergency service is required — 110

Determine that the UE is using CP CIoT optimization — 130

Transmit a NAS message including an indication that an emergency service is requested — 150 ting a message (e.g. CPSR message) for sending data (e.g. not related to an emergency service).

12 Claims, 2 Drawing Sheets

(58) Field of Classification Search
CPC . H04W 76/32; H04W 76/50; H04W 28/0289; H04W 28/0242
USPC ...................................................... 455/404.1
See application file for complete search history.

(56) References Cited

U.S. PATENT DOCUMENTS

| | | | |
|---|---|---|---|
| 10,841,768 | B2 | 11/2020 | Ke et al. |
| 11,412,412 | B2 * | 8/2022 | Narath ................... H04W 76/12 |
| 11,564,121 | B2 | 1/2023 | Lanev et al. |
| 2005/0153687 | A1 * | 7/2005 | Niemenmaa ........ H04L 12/2854 |
| | | | 455/414.1 |
| 2012/0189016 | A1 | 7/2012 | Bakker et al. |
| 2012/0281566 | A1 * | 11/2012 | Pelletier ................ H04W 76/27 |
| | | | 370/252 |
| 2014/0016614 | A1 * | 1/2014 | Velev .................... H04W 76/10 |
| | | | 370/331 |
| 2017/0325050 | A1 * | 11/2017 | Kodaypak ........... H04L 65/1069 |
| 2018/0295556 | A1 | 10/2018 | Baek et al. |
| 2018/0376531 | A1 | 12/2018 | Martinez Tarradell et al. |
| 2019/0007992 | A1 * | 1/2019 | Kim ...................... H04W 76/27 |
| 2019/0021064 | A1 * | 1/2019 | Ryu ....................... H04W 60/06 |
| 2019/0037441 | A1 * | 1/2019 | Liu ........................ H04W 60/00 |
| 2019/0059067 | A1 * | 2/2019 | Lee ....................... H04W 60/04 |
| 2019/0132889 | A1 | 5/2019 | Kim et al. |
| 2019/0246318 | A1 * | 8/2019 | Kim ...................... H04W 48/08 |
| 2019/0320485 | A1 | 10/2019 | Kim et al. |
| 2020/0037203 | A1 * | 1/2020 | Ianev ................. H04W 28/0289 |
| 2020/0163134 | A1 * | 5/2020 | Ying .................... H04W 76/27 |
| 2020/0280948 | A1 * | 9/2020 | Youn .................... H04W 68/02 |
| 2020/0304985 | A1 * | 9/2020 | Gupta ................. H04W 68/005 |
| 2020/0323020 | A1 * | 10/2020 | Liu ........................ H04W 80/10 |
| 2020/0351984 | A1 * | 11/2020 | Talebi Fard ............ H04W 4/08 |
| 2021/0058840 | A1 | 2/2021 | Kawasaki et al. |
| 2021/0084528 | A1 * | 3/2021 | Kim ................. H04W 28/0242 |
| 2021/0136840 | A1 * | 5/2021 | Kawasaki ............. H04W 84/12 |
| 2021/0136843 | A1 * | 5/2021 | Kawasaki ............. H04W 28/24 |
| 2021/0250890 | A1 * | 8/2021 | Won ...................... H04W 48/16 |
| 2021/0298111 | A1 * | 9/2021 | Pham Van .......... H04W 74/004 |
| 2021/0360742 | A1 * | 11/2021 | Liao ...................... H04W 60/00 |
| 2021/0392574 | A1 * | 12/2021 | Tiwari .................. H04W 76/10 |
| 2022/0014920 | A1 * | 1/2022 | Pham Van ............. H04W 4/20 |
| 2022/0086236 | A1 * | 3/2022 | Zhang .................. H04L 67/146 |
| 2022/0117016 | A1 * | 4/2022 | Velev ..................... H04L 67/12 |
| 2022/0240213 | A1 * | 7/2022 | Ly ........................... H04W 4/14 |
| 2022/0377613 | A1 * | 11/2022 | Watfa ................ H04W 28/0908 |
| 2024/0064863 | A1 * | 2/2024 | Dauneria ............. H04W 76/34 |

FOREIGN PATENT DOCUMENTS

| | | | |
|---|---|---|---|
| EP | 2503838 | A2 | 9/2012 |
| EP | 3866498 | A2 | 8/2021 |
| EP | 3949669 | A1 | 2/2022 |
| JP | 2019125844 | A | 7/2019 |
| KR | 102029742 | B1 | 10/2019 |
| WO | 2011039636 | A2 | 4/2011 |
| WO | 2018070172 | A1 | 4/2018 |
| WO | 2018125795 | A1 | 7/2018 |
| WO | 2018138355 | A1 | 8/2018 |
| WO | 2019182430 | A1 | 9/2019 |
| WO | 2020/201624 | A1 | 10/2020 |

OTHER PUBLICATIONS

United Kingdom Intellectual Property Office, "Combined Search and Examination Report," dated Sep. 17, 2020, in connection with United Kingdom Patent Application No. 2005242.9, 7 pages.

3GPP TS 24.501 V16.4.0 (Mar. 2020); Technical Specification; 3rd Generation Partnership Project (3GPP); Non-Access-Stratum (NAS) procedures in the 5G system (5GS); 667 pages.

3GPP TS 24.301 V16.3.0 (Dec. 2019); Technical Specification; 3rd Generation Partnership Project; Technical Specification Group Core Network and Terminals; Non-Access-Stratum (NAS) protocol for Evolved Packet System (EPS); Stage 3 (Release 16); 570 pages.

3GPP TS 24.501 V16.3.0 (Dec. 2019); Technical Specification; 3rd Generation Partnership Project (3GPP); Non-Access-Stratum (NAS) procedures in the 5G system (5GS); 645 pages.

Supplementary European Search Report dated Dec. 15, 2022 in connection with European Patent Application No. 21 78 5567, 5 pages.

Combined Search and Examination Report under Sections 17 and 18(3) dated Aug. 17, 2021 in connection with United Kingdom Patent Application No. GB2013218.9, 8 pages.

Combined Search and Examination Report under Sections 17 and 18(3) dated Nov. 16, 2022 in connection with United Kingdom Patent Application No. GB2211141.3, 5 pages.

"3rd Generation Partnership Project; Technical Specification Group Core Network and Terminals; Non-Access-Stratum (NAS) protocol for 5G System (5GS); Stage 3; (Release 16)", 3GPP TS 24.501 V16.4.1 (Mar. 2020), 666 pages.

Notification of the First Office Action issued Jun. 22, 2024, in connection with Chinese Patent Application No. 202180025733.9, 15 pages.

Ericsson (Rapporteur), "CR to capture C-IoT optimizations for non-NB-IoT UEs", R2-164519, 3GPP TSG-RAN WG2 Meeting #94, Nanjing, China, May 23-27, 2016, 51 pages.

Notification of the Second Office Action issued Nov. 25, 2024, in connection with Chinese Patent Application No. 202180025733.9, 14 pages.

* cited by examiner

[Fig. 1]
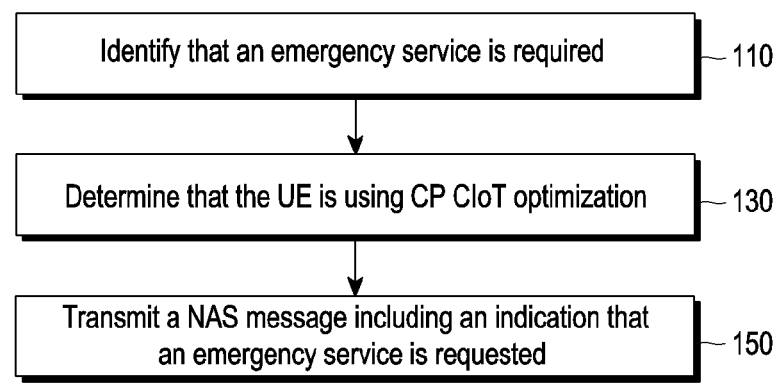
[Fig. 2]
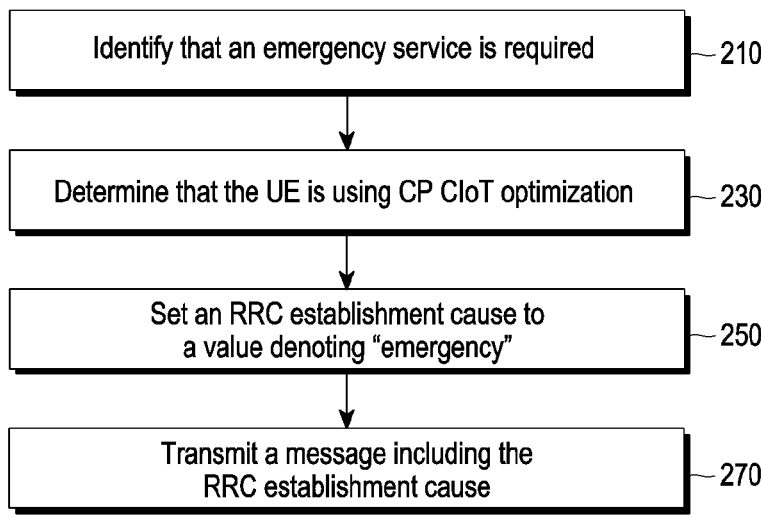
[Fig. 3]
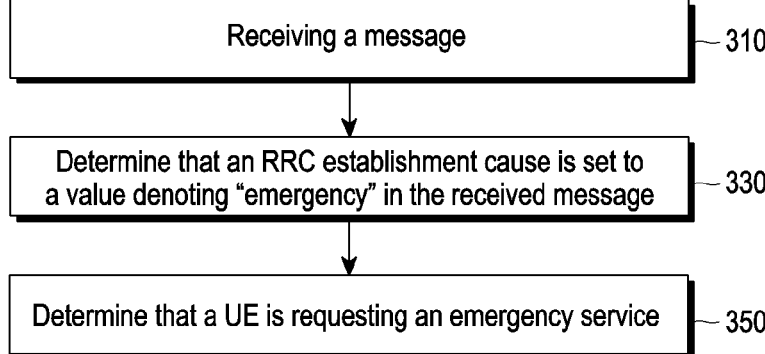

[Fig. 4]

METHOD AND APPARATUS FOR PROVIDING EMERGENCY SERVICE IN A NETWORK

CROSS-REFERENCE TO RELATED APPLICATIONS

This application is a 371 of International Application No. PCT/KR2021/002887 filed Mar. 9, 2021, which claims priority to United Kingdom Patent Application No. 2005242.9 filed Apr. 8, 2020, and United Kingdom Patent Application No. 2013218.9 filed Aug. 24, 2020 the disclosures of which are herein incorporated by reference in their entirety.

BACKGROUND

1. Field

Certain examples of the present disclosure provide methods and apparatus for providing emergency services for user equipments (UEs) in a network. For example, certain examples of the present disclosure provide methods and apparatus for enabling emergency services for UEs that use control plane (CP) cellular internet of things (CIoT) optimization in 3rd generation (3GPP) 5th generation (5G).

2. Description of the Related Art

To meet the demand for wireless data traffic having increased since deployment of 4th generation (4G) communication systems, efforts have been made to develop an improved 5G or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to assist with an understanding of the present disclosure. No determination has been made, and no assertion is made, as to whether any of the above might be applicable as prior art with regard to the present invention.

SUMMARY

Certain embodiments herein is to present disclose method and apparatus for providing emergency service in a network.

And, certain examples of the present disclosure provide methods and apparatus for enabling emergency services for UEs that use CP CIoT optimization in 3GPP 5G.

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present invention is defined in the independent claims. Advantageous features are defined in the dependent claims.

Other aspects, advantages, and salient features will become apparent to those skilled in the art from the following detailed description, taken in conjunction with the annexed drawings, which disclose examples of the present disclosure.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIG. 1 illustrates an exemplary a method for providing emergency service in a network that may be used in examples of the present disclosure.

FIG. 2 illustrates another exemplary a method for providing emergency service in a network that may be used in examples of the present disclosure.

FIG. 3 illustrates another exemplary a method for providing emergency service in a network that may be used in examples of the present disclosure.

FIG. 4 illustrates a block diagram of an exemplary network entity that may be used in certain examples of the present disclosure.

DETAILED DESCRIPTION

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the" encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present invention are to be understood to be applicable to any other aspect, embodiment, example or claim described herein unless incompatible therewith.

Acronyms, Abbreviations and Definitions

In the present disclosure, the following acronyms, abbreviations and definitions are used.

3GPP $3^{rd}$ generation partnership project
2G $2^{nd}$ generation
3G $3^{rd}$ generation
5G $5^{th}$ generation
5GC 5G core
5GMM 5G mobility management
5GS 5G system
AMF access and mobility management function
CIoT cellular IoT
CP control plane
CPSR control plane service request
CS circuit switched
CSFB circuit switched fallback
EDGE enhanced data rates for GSM evolution
EPS evolved packet system
ESM EPS session management
E-UTRA evolved universal terrestrial radio access
GERAN GSM EDGE radio access network
GSM global system for mobile communications
ID identity/identifier
IE information element
IoT internet of things
MME mobility management entity
N1 interface between UE and AMF
N1 mode a mode of a UE allowing access to the 5G core network via the 5G access network
N3 interface between UPF and NG-RAN
N26 interface between AMF and MME
NAS non access stratum
NB narrowband
NG next generation
PDN packet data network
PDU protocol data unit
RAN radio access network
RAT radio access technology
RRC radio resource control
S1 mode a mode of a UE that operates with a functional division that is in accordance with the use of an S1 interface between the radio access network and the core network
SMS short message service SR service request
TAU tracking area update
TS technical specification
UE user equipment
UL uplink
UMTS universal mobile telecommunications system
UP user plane
UPF user plane function
UTRAN UMTS terrestrial radio access network
WB wideband
Herein, the following documents are referenced:
GPP TS 24.501 V16.3.0
GPP TS 24.301 V16.3.0

Overview of CIoT Optimizations

There are primarily two main types of CIoT optimizations referred to as: UP CIoT optimization and CP CIoT optimization. Both of these CIoT optimizations apply to EPS and 5GS.

UP CIoT optimization refers to optimizations that relate to the use of the user plane resources. Whereas CP CIoT optimization refers to optimizations that relate to the efficient transfer of data over the control plane. Note that "data" may also refer to SMS and location service messages.

The NAS specifications TS 24.501111 (for N1 mode) and TS 24.301121 (for S1 mode) provide a description of these optimizations and specifically have some sections that specify the UE and network behaviour when CP CIoT optimization is used. For example, Sections 5.6.1.2.2 and 5.6.1.4.2 are particular to the case when CP CIoT optimization is used.

One of the main aspects of CP CIoT optimization is that the UE can send data from idle mode using the CPSR message that has been defined in [1] and [2]. Although the contents of the CPSR message for 5GS as defined in [1] are not exactly the same as those for the CPSR message for EPS as defined in [2], there are some common aspects between these messages. For example, there is a Control plane service type field in the CPSR that is defined in [1] which defines a Control plane service type value that can indicate "mobile originating request" (for which the 3 bit field will have the value '000') or "mobile terminating request" (for which the 3 bit field will have the value '001'). Similarly, [2] uses the same values for the Control plane service type value of the Control plane service type field in the CPRS message in [2].

Usually, the UE uses one of these optimizations at a time although it is possible that both get used simultaneously as will be explained below. When the UE uses CP CIoT optimization, the UE's PDU sessions (or PDN connections in S1 mode) will be used to transfer data over the control plane, i.e. over NAS signalling messages. However, a PDU session that is used for CP CIoT optimization can be a control plane only session, if the PDU Session Establishment Accept message includes the Control plane only indication IE (see [1]), or the session can be used for CP CIoT optimization and can be switched to a user plane session. Note that the latter is not a permanent switch to a user plane session but rather the UE can request the establishment of the user plane resources and use these resources for the transfer of data over the user plane. The UE may request the switch of the session to user plane based on, for example, the volume of data that needs to be sent or based on other conditions that are not specified. However what is important to note is that a PDU session for CP CIoT optimization may be a session for control plane data only, or may allow the UE to request the establishment of user plane resources for the transfer of data over the user plane while still considering that the session is for CP CIoT optimization.

When a PDU session gets switched to user plane (i.e. when the user plane resources gets established for such a PDU session), if the UE also supports UP CIoT optimization, then the UE can apply UP CIoT optimization to this session for which user plane has been established. Note that after the release of the user plane resources, the UE continues to use the session as one for CP CIoT optimization unless the UE requests the establishment of user plane resources again. Note that although the user plane resources may be established for a PDU session for CP CIoT optimization, the UE maintains the use of the CPSR message when it needs to initiate the service request procedure for the corresponding PDU session.

Emergency services are not supported over NB-IoT however they are supported over E-UTRA (i.e. WB-EUTRA) if a UE that supports WB-EUTRA is capable of emergency services.

Contents of the Service Request and Control Plane Service Request message

The Service Request message defined in [1] has a mandatory field that is called the Service type field which indicates, based on the value it is set to, the reason for sending the Service Request message by the UE. For example, when the UE needs to request emergency services, the Service type field will be set to "emergency services" as defined in section 9.11.3.50 of [1].

Regarding the CPSR message, as indicated above, there is also a similar field that is called Control plane service type field which currently only takes one of two values as indicated previously, i.e. either "mobile originating request" or "mobile terminating request".

It should be noted that a UE which does not use CP CIoT optimization will not send the CPSR message. Instead the UE sends the Service Request message when it initiates the service request procedure. On the other hand, a UE which is using CP CIoT optimization sends the CPSR message when it initiates the service request procedure.

Certain examples of the present disclosure provide methods and apparatus for providing emergency services for UEs in a network. The following examples are applicable to, and use terminology associated with, 3GPP 5G. For example, certain examples of the present disclosure provide methods and apparatus for enabling emergency services for UEs that use CP CIoT Optimization in 3GPP 5G. However, the skilled person will appreciate that the techniques disclosed herein are not limited to these examples or to 3GPP 5G, and may be applied in any suitable system or standard, for example one or more existing and/or future generation wireless communication systems or standards.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network. For example, the functionality of the AMF in the examples below may be applied to any other suitable type of entity performing mobility management functions.

The skilled person will appreciate that the present invention is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

Certain examples of the present disclosure may be provided in the form of an apparatus/device/network entity configured to perform one or more defined network functions and/or a method therefor. Certain examples of the present disclosure may be provided in the form of a system (e.g. a network) comprising one or more such apparatuses/devices/network entities, and/or a method therefor. For example, in the following examples, a network may include a UE, and an AMF entity.

At least the following problems exist in view of the related art:

For UEs that Use CP CIoT Optimization, it is Unclear which NAS message has to be sent when requesting emergency services As indicated above, the UE which uses CP CIoT optimization will send or use the CPSR message when the service request procedure is initiated. The CP CIoT optimization can be supported by a UE which also supports WB-E-UTRA and which may also support emergency services.

One problem is the following: for a UE that supports WB-E-UTRA (either in S1 mode or N1 mode) and that is using CP CIoT optimization, it is not clear which NAS message such a UE will send when it needs to request emergency services.

As indicated above, a UE that uses CP CIoT optimization will usually only use or send the CPSR message. However, the Control plane service type field of the CPSR message does not have any value for emergency services and it is not clear whether such a UE will actually use the CPSR message or the Service Request message when an emergency service needs to be requested. Certain examples of the present disclosure address this problem by specifying the UE behaviour, which is currently missing for this scenario.

Other Problems

There are other problems that are associated with requesting emergency fallback while the UE is in 5GS. One problem is associated with how the UE's PDU sessions will be treated once the UE goes to EPS. In EPS, there isn't a possibility to selectively establish user plane (UP) resources for certain PDN connections but not others. For example, assume the UE has PDN connection X and PDN connection Y, when the UE requests the establishment of UP resources, then the network will setup UP resources for all of the UE's PDN connections, in this case PDN connection X and PDN connection Y, where it is assumed that these PDN connections are not for control plane only usage. Contrary to this, in 5GS the UE can indicate which PDU session it wants user plane resources to be established. Hence, with the example provided, the UE in 5GS can for example request the establishment of UP resources for PDU session Y but not X. This is done by setting the corresponding bit in the Uplink data status IE.

As such, when a UE goes from 5GS to EPS, e.g. due to fallback for emergency services, it needs to be ensured that the UE can have UP resources for all of its PDU sessions that are currently established in 5GS. There are certain PDU sessions in 5GS (or correspondingly PDN connection in EPS) that may be established for control plane only when the UE is using control plane (CP) CIoT 5GS optimization. The use of CP CIoT 5GS optimization does not necessarily mean every PDU session will be for control plane only, rather it is possible that this occurs. It should be noted that a PDU session that is for CP only is determined to be so when the UE receives the Control plane indication IE in the PDU Session Establishment Accept message in 5GS, or when the UE receives the Control plane indication IE in the Activate Default EPS Bearer Context Request message. In both cases, a PDU session or PDN connection that is for control plane only will have the Control plane indication IE will indicate so accordingly in the NAS message.

As such, when the UE is in EPS, either due to a fallback procedure from 5GS or due to a request to use emergency services, the UE may not be able to request the establishment of UP resources since some of the PDU sessions/PDN connections may be associated with a control plane only indication. Therefore, a mechanism is needed to ensure that the UE can use emergency services in EPS while also being able to request UP resources for all of its PDN connections.

In view of the above problem, certain examples of the present disclosure provide one or more of the following solutions.

Certain examples of the present disclosure provide well-defined UE behaviour regarding which NAS message to use for requesting emergency services when the UE is using CP CIoT optimization. The UE behaviour is currently unspecified in the related art.

In the present disclosure, different conditions, based on which different NAS messages should be used by the UE, are disclosed.

FIG. 1 illustrates an exemplary a method for providing emergency service in a network that may be used in examples of the present disclosure.

Referring to FIG. 1, the UE identifies that an emergency service is required at step 110 and determines that the UE is using CP CIoT optimization at step 130. Then the UE transmits a NAS message including an indication that an emergency service is requested at step 150.

In other words, certain examples of the present disclosure provide a method, for a UE in a network, for requesting an emergency service, the method comprising: when an emergency service is required, if the UE is using CP CIoT optimization, transmitting a NAS message including an indication that an emergency service is requested.

The NAS message may be a CPSR message and the indication may be a predetermined value (e.g. denoting "emergency service") in a predetermined field (e.g. Control plane service type field) of the message.

The UE may be in 5GMM-IDLE mode.

The method may further comprise setting an RRC establishment cause to a value denoting "emergency".

The method may further comprise determining whether the network supports emergency services (e.g. based on a 5GS network feature support IE in a Registration Accept message).

If the network does not support emergency services, the NAS message may be a CPSR message and the indication may be a predetermined value denoting "emergency service fallback" in a predetermined field (e.g. Control plane service type field) of the message.

The NAS message may be a Service Request message and the indication may be a predetermined value (e.g. denoting "emergency service" or "emergency service fallback") in a predetermined field (e.g. Service type field) of the message, and transmitting the Service Request message may be prioritised over transmitting a message (e.g. CPSR message) for sending data (e.g. not related to an emergency service).

The method may further comprise, after completion of a service request procedure, transmitting the data (e.g. CIoT user data, SMS, or location services message) (e.g. using an UL NAS TRANSPORT message) (e.g. once in 5GMM-CONNECTED mode).

Transmitting the Service Request message may be prioritised based on a condition, wherein the condition comprises one or more of: if the service request procedure corresponding to the Service Request message is being initiated to request establishment of user plane resources for a PDU session for the emergency service; if there is a PDU session that has been established for the emergency service; and unless the service request procedure corresponding to the Service Request message is not being initiated for emergency services or for requesting establishment of user plane resources for a PDU session for the emergency service.

The method may further comprise transitioning from a first mode (e.g. 5GMM-IDLE mode) to a second mode (e.g. 5GMM-CONNECTED mode) using the Service Request message.

The transitioning may be performed using the Service Request message if the UE has a PDU session for the emergency service.

The method may further comprise requesting establishment of user plane resources for a PDU session for the emergency service using the CPSR message or the Service Request message.

The establishment of the user plane resources may be requested using the Service Request message if the UE has a PDU session for the emergency service.

FIG. 2 illustrates another exemplary a method for providing emergency service in a network that may be used in examples of the present disclosure.

Referring to FIG. 2, the UE identifies that an emergency service is required at step 210 and determines that the UE is using CP CIoT optimization at step 210.

Then the UE sets an RRC establishment cause to a value denoting "emergency" at step 250 and transmits a message including the RRC establishment cause at step 270.

In other words, certain examples of the present disclosure provide a method, for a UE in a network, for requesting an emergency service, the method comprising: when an emergency service is required, if the UE is using CP CIoT optimization, setting an RRC establishment cause to a value denoting "emergency".

The UE may be operating in one of N1 mode and S1 mode.

FIG. 3 illustrates another exemplary a method for providing emergency service in a network that may be used in examples of the present disclosure. Referring to FIG. 3, the network entity (e.g. an AMF entity) receives a message at step 310 and determines that an RRC establishment cause is set to a value denoting "emergency" in the received message at step 330. Then the network entity determines that a UE is requesting an emergency service at step 350.

In other words, certain examples of the present disclosure provide a method, for a network entity (e.g. an AMF entity), the method comprising: determining whether an RRC establishment cause is set to a value denoting "emergency"; and if the RRC establishment cause is set to the value denoting "emergency", determining that a UE is requesting an emergency service.

Requesting Emergency Service by a UE that Uses CP CIoT Optimization

This section defines examples of UE behaviour to enable the request of emergency services when the UE is using CP CIoT optimization. The skilled person will appreciate that the examples disclosed herein may apply not only to UEs that support WB-E-UTRA but to any other RAT over which emergency services may be supported.

Furthermore, the skilled person will appreciate that the examples disclosed herein may apply to N1 mode (5GS) and S1 mode (EPS). Although the examples disclosed herein refer to features and message names from 5GS, the skilled person will appreciate that the present invention is not limited to these examples. For example, certain examples of the present disclosure may be applied equally, correspondingly or accordingly in S1 mode.

Solution Option 1: Define a New Field for the CPSR Message to be Used for Emergency Services In this solution, a new value may be defined for the purpose of requesting emergency services. For example, the new value may be for the Control plane service type field of the CPSR message, where the new value may be, for example. "emergency services".

The UE that is using CP CIoT optimization may determine if the network supports emergency services based on the 5GS network feature support IE in the Registration Accept message.

In certain examples, if the UE needs to request the use of emergency services, optionally while in 5GMM-IDLE mode, and the UE is using CP CIoT optimization, the UE should send the CPSR message with the Control plane service type field set to "emergency services". In this case, the UE should also set the RRC establishment cause to "emergency".

In certain examples, it is possible that emergency services are not supported in 5GC and the UE would need to perform emergency services fallback as defined in [1]. For this purpose, i.e. when the UE wants to use emergency services fallback, then certain examples of the present disclosure may define and use a new value for the Control plane service type field, for example "emergency services fallback". The UE may use the CPSR message and set the Control plane service type field as disclosed herein (e.g. to "emergency services fallback") for this purpose. In certain examples, if the UE is sending the message from 5GMM-IDLE mode, then the UE should also set the RRC establishment cause to "emergency". If the UE is in 5GMM-CONNECTED mode, then the UE may send the CPSR message with the new value for the Control plane service type field as described above for the purpose of performing emergency services fallback.

Alternatively, in certain examples of the present disclosure, even if no new values are defined for the Control plane service type field, the UE may set the set the RRC establishment cause to "emergency" when the UE needs to use emergency services from 5GMM-IDLE mode. The AMF, based on the RRC establishment cause that is received from the NG-RAN, may determine that the UE is requesting an emergency service even if the UE sent a CPSR message with the Control plane service type to "mobile originating request", which the UE should do in this case. Hence the AMF behaves as if it received a Service Request message with the Service type field set to "emergency services".

In certain examples of the present disclosure, for a UE with a PDU session that has been established for emergency services, if the UE is in 5GMM-IDLE mode and needs to initiate the service request procedure for the transfer of data, SMS or location services message (hereafter referred to as "data over control plane"), then the UE should send the CPSR message as specified in [1]. In this case, the UE need not set the RRC establishment cause to "emergency". If the UE also needs to request the establishment of user plane resources for the PDU session for emergency services, then the UE should include the Uplink data status IE and set the corresponding bit that identifies the PDU session ID associated with the PDU session for emergency services, e.g. to '1'. Moreover, the UE should set the RRC establishment cause to "emergency". In this case, if a new value for the Control plane service type as disclosed herein is defined, then the UE should additionally set the field to "emergency services". The same CPSR message may also carry data over the control plane.

In certain examples, in order to request emergency fallback, e.g. to set the Control plane service type field/IE, for example "emergency services fallback", the UE may check for one or more conditions, for example any combination of one or more of the following conditions:

The UE is using CP (control plane) CIoT 5GS optimization

The UE does not have any PDU session that is used for control plane only (i.e. the UE only has PDU sessions that are not for control plane only)

At least one PDU session is not for control plane only

The UE is operating in single registration mode

The N26 interface is available/supported in the network

The UE supports data transfer over the user plane (i.e. N3 data transfer)

The UE and/or the network support emergency services fallback (or fallback for emergency services)

Optionally when the UE indicates that it supports S1 mode and optionally S1 data transfer When one or more specific conditions (e.g. any combination of one or more of the above conditions) are met, the UE which is using control plane CIoT 5GS optimization can then request emergency fallback, for example as disclosed herein (e.g. by sending a CPSR and setting the Control plane service type IE to "emergency services fallback", or by sending a SR message and setting the service type IE to "emergency services fallback").

Alternatively, if the UE has at least one PDU session that is for control plane only, the UE may locally deactivate the PDU session if the UE is in idle mode and the UE needs to send a CPSR message (or SR message) to request emergency services fallback. In this case, the UE may include the PDU session status IE and set the bit corresponding to any PDU session that is for control plane only such that the bit indicates that the PDU session is no longer active in the UE (i.e. to indicate that the 5GSM state of the corresponding PDU session is PDU SESSION INACTIVE). The UE may include the Uplink data status IE in the CPSR message. The UE may send the CPSR message and set the control plane service type to "emergency services fallback". Alternatively, the UE may always take the action disclosed herein regardless of the type of PDU session or optionally only when there is at least one PDU session for control plane only (as such the UE may release all of its PDU sessions even if they are not all for control plane only).

If the UE is in connected mode, the UE may first release any PDU session that is for control plane only, for example by sending an explicit 5GSM NAS message, e.g. PDU Session Release Request message. Once all such PDU sessions (i.e. PDU sessions that are for control plane only) are released, the UE may send a CPSR message (or SR message) to request emergency services fallback as disclosed herein. Alternatively, the UE may locally release one or more PDU sessions (for example as described above) and send a Registration Request and include the PDU session status IE to indicate the PDU session(s) is/are released. The UE may then request emergency services fallback, for example by sending a CPSR message (or SR message) as described herein.

Alternatively, to use emergency services in a target system such as EPS or 2G (e.g. GERAN) or 3G (e.g. UTRAN, e.g. Iu-CS mode), the UE may autonomously reselect to the target system, for example the UE may autonomously perform idle mode reselection to S1 mode (e.g. the UE reselects or selects a cell in E-UTRA) or the UE reselects to Iu mode (e.g. Iu-CS mode) or the UE reselects a cell in the Circuit Switched (CS) domain or system. If the UE is in connected mode, the UE may first locally release its NAS connection before reselecting to a target system as disclosed herein. In this case, the UE may first locally deactivate any PDU session that is for control plane only or may deactivate all its PDU sessions regardless if they are for control plane only or not. The UE may do so if the UE and/or the network do not support emergency services fallback and the UE supports the CS domain (e.g. A mode or Iu-CS mode).

In certain examples, to take any of the actions disclosed above, the UE may first optionally release any of its PDU sessions, for example either locally or via explicit signalling as described herein. When all of the sessions are released, the UE may then send a CPSR message (or SR message) to request emergency services fallback as described herein.

Alternatively, when the UE sends a CPSR message (or SR message) requesting emergency services fallback (for example as disclosed herein), the AMF may take any suitable action, for example any combination of one or more of the following actions:

If the UE has any PDU session for control plane only, the AMF may deactivate or release the PDU session locally and inform the SMF to release the PDU session. The AMF may send the PDU session status IE in the Service Accept message to indicate that the PDU session is not active (i.e. to indicate that the 5GSM state of the corresponding PDU session is PDU SESSION INACTIVE).

If the UE has any PDU session for control plane only, the AMF performs emergency services fallback by performing redirection of the UE to EPS (i.e. S1 mode) or to E-UTRAN connection to 5GC if supported. Note that UE redirection is not a handover.

If the UE has at least one PDU session that is not for control plane only, the AMF may release all other PDU sessions that are for control plane only. The AMF may either execute or perform the emergency services fallback by means of a handover or redirection.

If the UE has no PDU session that is associated with control plane only, the AMF may perform emergency services fallback using handover or redirection based on its policies. The AMF may first establish the UP resources for all PDU sessions that are not for control plane only.

The AMF may always release all of the UE's PDU sessions even if only some of the PDU sessions are for control plane only.

The AMF may accept the request from the UE, optionally if the UE has no PDU session for control plane only, and/or optionally after receiving and verifying that the PDU session status IE would indicate so.

The AMF may take any combination of the actions disclosed above, optionally when the AMF supports N26 interface, and/or optionally when the UE is operating in single registration mode, and/or optionally when the UE and/or AMF supports emergency services fallback, and/or optionally when the UE indicates that it supports S1 mode and optionally S1 data transfer.

Optionally, while accessing a target system as part of emergency services fallback, or due to autonomous UE selection/reselection into a target system to place an emergency call (which may be over the CS domain), in certain examples the UE may locally release or deactivate any/all its PDU session(s), where optionally the UE may do so if the PDU session is for control plane only.

The skilled person will appreciate that the techniques described above may be applied in any suitable combination. The skilled person will also appreciate that the techniques described above are not restricted to the CPSR message only, but can also apply, for example, to the Registration Request messages when this message is sent instead of CPSR to request emergency services, for example as specified in 3GPP TS 24.501.

Certain problems discussed above may also apply to the case when the UE is in EPS and needs to request an emergency services. As such, the techniques described herein may be applied in that case as well. In this case the UE may be considered to be a UE that is using CP CIoT EPS optimization and as such can send the CPSR message (or SR message) and set the control plane service type to e.g. "emergency services" to request emergency services. Alternatively the UE may send the Extended Service Request and set the service type to "mobile originating CS fallback emergency call or 1xCS fallback emergency call".

For example, for a UE that is using CP CIoT EPS optimization, the UE may check for any suitable condition (s), for example any combination of one or more of the following, before requesting an emergency service with a CPSR message (or with a SR message).

The UE is using (control plane) CIoT EPS optimization

The UE does not have any PDN connection that is used for control plane only (i.e. the UE only has PDN connections that are not for control plane only)

At least one PDN connection is not for control plane only

The UE is operating in single registration mode

The N26 interface is available/supported in the network

The UE supports data transfer over the user plane (i.e. S1 data transfer)

The UE and/or the network support CSFB, and optionally have negotiated the use of CSFB When one or more certain conditions, for example any combination of one or more of the above conditions, are met, the UE that is using CP CIoT EPS optimization and that requires to use emergency service may then send a SR message and set the service type IE to "emergency services". The UE may optionally also set the "active" flag in the control plane service type IE to the value 1 to indicate "Radio bearer establishment requested". The UE may also set the RRC establishment cause to "emergency".

Alternatively, if the UE has at least one PDN connection that is for control plane only and optionally if the UE is in idle mode, and if the UE wants to send a CPSR message (or SR message) to request an emergency service, the UE may locally deactivate the default EPS bearer of any PDN connection that is for control plane only. The UE may also locally deactivate any dedicated EPS bearer that is associated with such a PDN connection (or that is associated with the default EPS bearer of such a PDN connection). In this case, the UE may include the EPS bearer context status IE and set the bit corresponding to any default EPS bearer (or any dedicated EPS bearer) such that the bit indicates that the EPS bearer context is inactive in the UE (i.e. to indicate that the ESM state of the corresponding EPS bearer context is BEARER CONTEXT-INACTIVE). The UE may include the EPS bearer context status IE in the CPSR message. The UE then sends the CPSR message (or SR message) to request emergency services.

If the UE is in connected mode, the UE may first release any PDN connection that is for control plane only by sending an explicit ESM NAS message, e.g. PDN DISCONNECT REQUEST message. Once all such PDN connections (i.e. PDU connections that are for control plane only) are released, the UE may send a CPSR message (or SR message) to request emergency services, for example as described herein.

Alternatively, to use emergency services in a target system such as 2G (e.g. GERAN) or 3G (e.g. UTRAN), the UE may autonomously reselect to the target system, for example the UE may autonomously perform idle mode reselection to e.g. UTRAN (Iu mode or Iu-CS mode) or the UE may reselect a cell in the Circuit Switched (CS) domain or system (in Iu mode or A mode). If the UE is in connected mode, the UE may first locally release its NAS connection before reselecting to a target system, for example as described herein. In this case, the UE may first locally deactivate any PDN connection that is for control plane only, or any default (or dedicated) EPS bearer that is associated with a PDN connection that is for control plane only, or may deactivate all its PDN connections or EPS bearers regardless if they are for control plane only or not. The UE may do so if the UE and/or the network do not support CS fallback and the UE supports the CS domain (e.g. A mode or Iu-CS mode).

Alternatively, a UE that is using CP CIoT EPS optimization may, for example if the network (e.g. EPS) does not support IMS emergency, and/or if the UE does not support emergency over the PS domain (e.g. IMS emergency), request to use CS fallback for emergency by sending a CPSR message, or a SR message, and setting the service type to "mobile originating CS fallback emergency call or 1xCS fallback emergency call". In this case, any of the techniques described above may be applied. The UE may first register to use CSFB by either sending a TAU or attach request and then request to use CSFB.

Alternatively, when the UE sends a CPSR message (or SR message) requesting emergency services (for example as described herein), the MME may take any suitable action(s), for example any combination of one or more of the following actions:

If the UE has any PDN connection that is for control plane only, the MME may deactivate or release the PDU connection locally (or the MME may deactivate the default EPS bearer and any dedicated EPS bearer that is associated to the PDN connection) that is for control plane only. The MME may send the EPS bearer context status IE in the Service Accept message to indicate each EPS bearer context that is not active (i.e. to indicate that the ESM state of the corresponding EPS bearer context is BEARER CONTEXT-INACTIVE).

If the UE has any PDN connection for control plane only, and if the UE sent the Extended Service Request message to request CSFB for emergency (i.e. the service type in the CPSR or SR message is set to "mobile originating CS fallback emergency call or 1xCS fallback emergency call") the MME may perform CS fallback by performing redirection of the UE to a target CS system such as GERAN (A mode) or UTRAN (Iu-CS mode).

If the UE has at least one PDN connection that is not for control plane only, the MME may release all other PDN connections that are for control plane only (or release each EPS bearer that is associated with such a PDN connection for control plane only). The MME may either execute or perform the CS fallback by means of a handover or redirection.

The MME may always release all of the UE's PDN connection even if not all of them are for control plane only.

The MME may accept the request from the UE, optionally if the UE has no PDN connection for control plane only, and/or optionally after receiving and verifying that the EPS bearer context status IE would indicate so.

If the UE has no PDN connection that is associated with control plane only, the MME may perform CS fallback using handover or redirection based on its policies. To perform CSFB with handover, the MME may first establish the UP resources for all PDN connections or EPS bearers that are not for control plane only.

Optionally, while accessing a target system as part of CS fallback, or due to autonomous UE selection/reselection into a target system to place an emergency call (which may be over the CS domain), in certain examples the UE may locally release or deactivate any PDN connection, where optionally the UE may do so if the PDN connection is for control plane only. Alternatively, the UE may locally release or deactivate any EPS bearer that is associated with a PDN connection that is for control plane only.

The skilled person will appreciate that the techniques described herein may also be applied to other NAS messages, such as Tracking Area Update Request message, and are not limited to the CPSR, SR, or Extended Service Request message.

The skilled person will appreciate that the techniques described herein may be applied in any suitable combination and to/in any suitable system.

In the present disclosure, "redirection" may include "idle mode cell redirection".

Solution Option 2: The UE Uses the Service Request Message for Emergency Services In this solution, the UE may use the Service Request message when it needs to initiate the service request procedure from 5GMM-IDLE mode for the purpose of emergency services even if the UE is using CP CIoT optimization.

Hence, even if the UE has data to send using the CPSR message, the UE may prioritize sending the Service Request message in this case, optionally especially if the emergency service request is one for emergency fallback services. The UE, once in connected mode, can then use the UL NAS TRANSPORT message to send any data (e.g. CIoT user data, SMS, or location services message) after the completion of the service request procedure.

In certain examples of the present disclosure, the prioritization of the Service Request message over the CPSR message may be done at all times as long as the UE needs to establish a PDU session for emergency services, or as long as there is a PDU session that has been established for emergency services. Alternatively, the UE may use the Service Request message from 5GMM-IDLE mode to transition to 5GMM-CONNECTED mode and establish a PDU session for emergency services. Once established, the UE may then use the CPSR message even for the purpose of the PDU session for emergency services, for example when the UE is in connected mode or in idle mode. The UE (which is also using CP CIoT optimization) may use the CPSR message when it needs to request the establishment of user plane resources for the PDU session for emergency services.

Alternatively, in certain examples of the present disclosure, when in idle mode, the UE may use or send the CPSR message as long the service request procedure is not initiated for emergency services (including the request to establish user plane resources for a PDU session for emergency services). Otherwise, if the service request is being initiated to request the establishment of user plane resources for emergency services, the UE may use the Service Request message.

Alternatively, in certain examples of the present disclosure, as long as the UE has a PDU session for emergency services, the UE may always use the Service Request message to transition from idle mode to connected mode (even if the UE has data over the control plane to send), or to request the establishment of user plane resources, either for the PDU session for emergency services or all PDU sessions that are active in the UE. Optionally, the CPSR message may be used only to request the establishment of user plane resources for a PDU session that is not the PDU session for emergency services.

Alternatively, in certain examples of the present disclosure, the UE may use or send the Service Request message to request emergency services fallback, while the CPSR message may be used for all requests that are not associated with an emergency service.

The skilled person will appreciate that the techniques described herein may be applied to S1 mode. Although certain examples are disclosed herein in the context of 5GS, the skilled person will appreciate that the techniques described herein are not limited to 5GS. For example, they may be applied to EPS in a similar, corresponding or equivalent manner.

In certain examples of the present disclosure, the UE behaviour with respect to requesting emergency services when the UE is also using CP CIoT optimization is specified and predictable. Accordingly, which NAS message to use and how to set its contents becomes clear and is thus testable. The network behaviour is therefore also specified as the network can then process a message in a correct manner when the conditions are met. Otherwise, the network may consider the use of certain messages as an error and ignore them, which may lead to delays to the setup of any emergency service.

Figure 4:
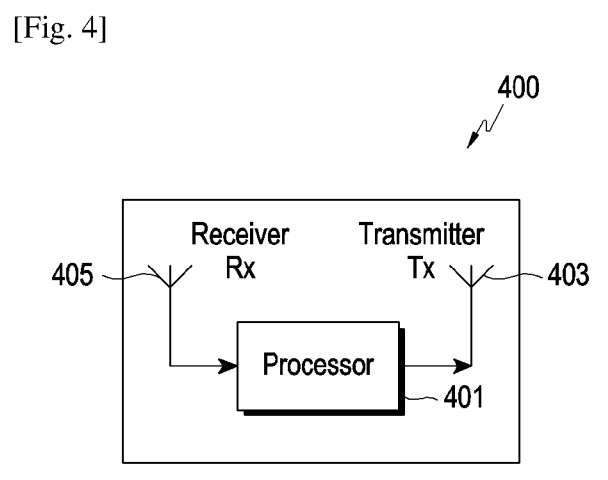

FIG. 4 is a block diagram of an exemplary network entity that may be used in examples of the present disclosure. For example, the UE, AMF and/or any other suitable network entity may be provided in the form of the network entity illustrated in FIG. 4. The skilled person will appreciate that the network entity illustrated in FIG. 4 may be implemented, for example, as a network element on a dedicated hardware, as a software instance running on a dedicated hardware, or as a virtualised function instantiated on an appropriate platform, e.g. on a cloud infrastructure.

The entity 400 comprises a processor (or controller) 401, a transmitter 403 and a receiver 405. The receiver 405 is configured for receiving one or more messages or signals from one or more other network entities. The transmitter 403 is configured for transmitting one or more messages or signals to one or more other network entities. The processor 401 is configured for performing one or more operations and/or functions as described above. For example, the processor 401 may be configured for performing the operations of a UE or AMF.

The techniques described herein may be implemented using any suitably configured apparatus and/or system. Such an apparatus and/or system may be configured to perform a method according to any aspect, embodiment, example or claim disclosed herein.

Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the invention has been shown and described with reference to certain examples, it will be understood by those skilled in the art that various changes in form and detail may be made therein without departing from the scope of the invention, as defined by any appended claims.

The invention claimed is:

1. A method performed by a user equipment (UE) in a 5G system (5GS) network, for a service request procedure, the method comprising:

determining that the UE is using control plane (CP) cellular internet of things (CIoT) 5GS optimization; and transmitting, to a network, a control plane service request (CPSR) message including control plane service type information set to emergency services and an uplink data status information element (IE) to indicate a protocol data unit (PDU) session for an emergency service, wherein the uplink data status in the CPSR message indicates the PDU session that has user data to be transmitted via user-plane resources by setting a bit corresponding to a PDU session identity of the PDU session to a first value.

2. The method of claim 1, further comprising:

in case that the emergency service is not supported by the 5GS network, transmitting a CPSR message including control plane service type information set to emergency services fallback.

3. The method of claim 2, wherein, in case that the UE does not have any PDU session used for control plane only, the control plane service type information set to emergency services fallback is included in the CPSR message.

4. The method of claim 1, further comprising transitioning from the 5GMM-IDLE mode to a 5GMM-CONNECTED mode.

5. The method of claim 1, further comprising:

requesting establishment of user plane resources for the PDU session for the emergency service using the CPSR message including the control plane service type information set to emergency services and the uplink data status IE indicating that the PDU session has the user data to be transmitted.

6. The method of claim 1, wherein the UE is operating in an N1 mode.

7. A user equipment (UE) in a 5G system (5GS) network, for a service request procedure, the UE comprising:

a transceiver; and a processor configured to:

determine that the UE is using control plane (CP) cellular internet of things (CIoT) 5GS optimization, and transmit, to a network, a control plane service request (CPSR) message including control plane service type information set to emergency services and an uplink data status information element (IE) to indicate a protocol data unit (PDU) session for an emergency service, wherein the uplink data status in the CPSR message indicates the PDU session that has the user data to be transmitted via user-plane resources by setting a bit corresponding to a PDU session identity of the PDU session to a first value.

8. The UE of claim 7, wherein the processor is further configured to:

in case that the emergency service is not supported by the 5GS network, transmit a CPSR message including control plane service type information set to emergency services fallback.

9. The UE of claim 8, in case that the UE does not have any PDU session used for control plane only, the control plane service type information set to emergency services fallback is included in the CPSR message.

10. The UE of claim 7, wherein the processor is further configured to transition from the 5GMM-IDLE mode to a 5GMM-CONNECTED mode.

11. The UE of claim 7, wherein the processor is further configured to request establishment of user plane resources for the PDU session for the emergency service using the CPSR message including the control plane service type information set to emergency services and the uplink data status IE indicating that the PDU session has the user data to be transmitted.

12. The UE of claim 7, wherein the UE is operating in an N1 mode.

* * * * *